E. KAUFMANN & R. J. HOLT.
MOUNT FOR SEATS.
APPLICATION FILED FEB. 3, 1913.
1,152,100.
Patented Aug. 31, 1915.
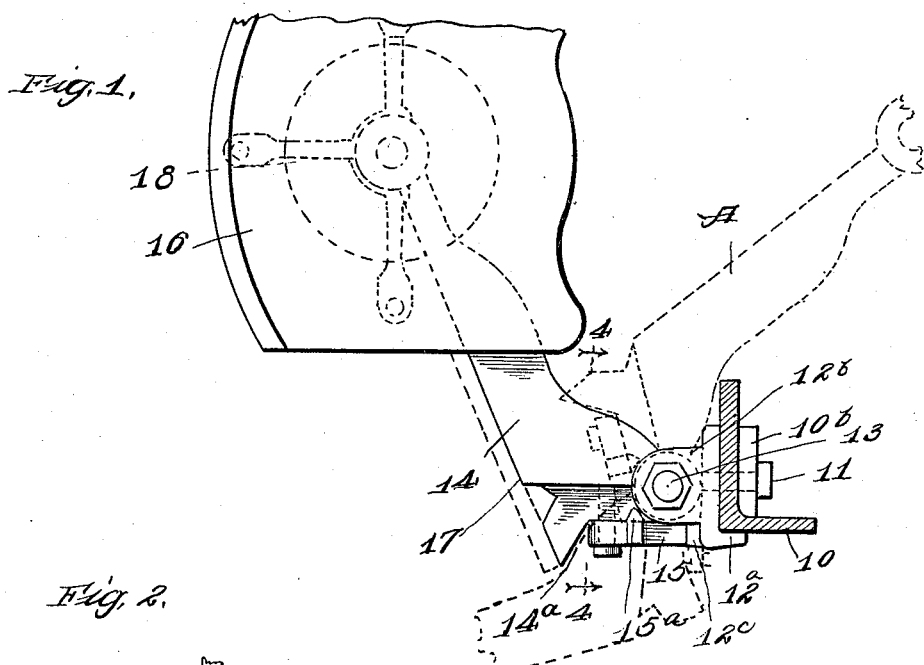
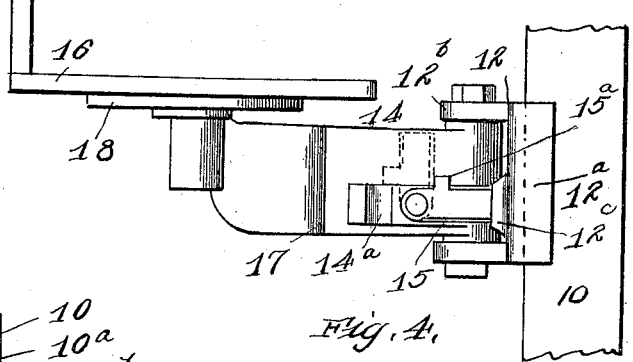
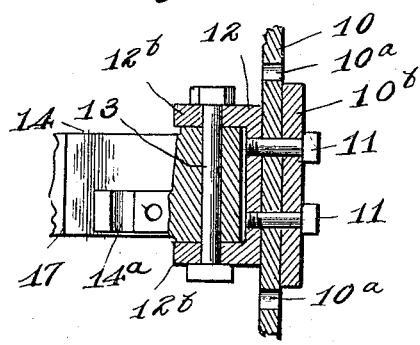
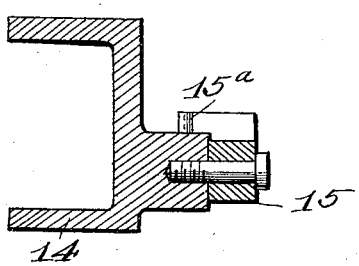
WITNESSES
G. A. Rauberschmidt
M. E. Lowry
INVENTORS
Emanuel Kaufmann
Robert J. Holt,
By A. M. Wilson, Attorney
COLUMBIA PLANOGRAPH CO., WASHINGTON, D. C.

UNITED STATES PATENT OFFICE.

EMANUEL KAUFMANN AND ROBERT J. HOLT, OF ATLANTA, GEORGIA; SAID HOLT ASSIGNOR TO SAID KAUFMANN.

MOUNT FOR SEATS.

1,152,100.  Specification of Letters Patent.  Patented Aug. 31, 1915.

Application filed February 3, 1913. Serial No. 745,940.

*To all whom it may concern:*

Be it known that we, EMANUEL KAUFMANN and ROBERT J. HOLT, citizens of the United States, and residing at Atlanta, in the county of Fulton and State of Georgia, have invented certain new and useful Improvements in Mounts for Seats, of which the following is a specification.

The present invention relates to improvements in mounts for seats, and has particular relation to mounts adapted to permit both a pivotal movement of the seat on its support and a swinging movement of the support on an independent axis.

Swinging seats are employed in various connections, as for instance, seats for operators of machines, telephones, scholars, etc., in which it is the purpose to provide for various positions to suit the conditions of the individual, and it is to this type of seat mounts that the present invention pertains.

Among the objects of our invention are to provide a construction which may be in the form of an attachment for supporting legs, etc., and which will permit the user of the seat to provide for swinging pivotal movements thereof either when in or out of position on the seat, and which will provide for a limitation in the swinging movement; to provide a construction in which the swinging movement of the mount may be limited in one direction, such limitation providing for a limiting in either of two positions at will, thereby enabling the operator to swing the seat to a convenient position for seating purposes and then restricting the length of movement after the seat has swung to the position of use, thus placing a stop in the path of free movement of the seat which will have the effect of tending to retain the seat in position and not require the operator to personally attempt to hold the seat in such position; also to provide a construction which is simple and efficient in operation, durable in construction, and which can be made at a relatively low cost.

To these and other ends, the nature of which will be readily understood as the invention is hereinafter disclosed, said invention consists in the improved construction and combination of parts hereinafter fully described, illustrated in the accompanying drawings, and more particularly pointed out in the appended claims.

In the accompanying drawings, in which similar reference characters indicate similar parts in each of the views: Figure 1 is a top plan view of a seat and its mount secured to a table leg, the seat and its mount being shown in its normal position of use in full lines, and in positions to which it may swing in dotted lines. Fig. 2 is an elevation of the same. Fig. 3 is a detail sectional view showing the manner in which the mount is secured to the leg. Fig. 4 is a detail sectional view taken on the line 4—4 of Fig. 1.

The present invention is particularly adapted for use in connection with the subject matter of the application of Emanuel Kaufmann, filed February 3, 1913 Serial No. 745,937 in which there is a disclosure of means for providing a support for a plurality of machine heads adapted to be operated individually, and in which each machine head is supported by a leg, which leg also carries the accessories by means of which the machine may be operated, including a seat mount. It will be readily understood, however, that the invention is of wider application, and we therefore do not desire to restrict the same to the specific use referred to therein.

10 designates the leg, which is shown in the drawing as angular in cross-section, although this particular form is not material, the leg being provided with a plurality of openings $10^a$ for the passage of bolts 11 by means of which a bracket 12 may be secured to the leg in any one of a plurality of positions.

In the drawings, we have shown a plate $10^b$ as interposed between the bolt heads and the leg, but it is to be understood that any desired form of securing means may be employed for securing the bracket 12 to the leg, as long as the means employed is of sufficient strength to prevent breaking of the connection when the seat is in use, the leverage provided placing a pressure on this form of connection. For the purpose of aiding in this respect, we preferably provide the bracket with a lateral extension $12^a$ which is adapted to extend around to an adjacent side of the leg, this projecting portion or extension tending to prevent a tilting movement of the parts and a tendency to shear the bolt connection.

The bracket is provided with a pair of ears $12^b$ having alined openings for the passage of a bolt 13 on which is mounted an arm 14, said arm being mounted to swing with the bolt as its vertical axis.

The arm 14 has its outer end formed to receive a seat member 18 to which is attached the seat 16, the construction of this portion of the arm being shown as of the general type which will permit a free pivotal movement of the seat on the arm.

The pivoted end of the arm is of a particular configuration, this end of the arm being provided with means for limiting the outward swinging movement of the arm, said arm portion being shown as provided with a face 14$^a$ inclined to the general direction of length of the arm and to which is pivotally secured a latch member 15, said member having a projection 15$^a$ which is adapted to overhang the arm for the purpose of limiting the downward movement of the latch. The free end of the latch is adapted to coöperate with a lug 12$^c$ of the bracket 12, said latch in this position, forming a stop to limit the outward swinging movement of the seat. This is the position shown in full lines in Fig. 1, and practically forms the preferred position in which the operator is seated when operating the machine. In this position, the limiting of the movement outwardly, provides an arrangement which aids the operator in that he or she is not required to attempt to hold the arm against outward movement.

As will be obvious, and as disclosed in the dotted line position A of Fig. 1, the arm and its seat can be freely swung in the opposite direction, thus placing the seat in a position under the table and out of the way.

As will be clear, the position of the arm in use is such as to make it inconvenient for the operator to be seated or to pass out of the seat. During these operations, the latch 15 is raised on its pivot, thus temporarily removing the stop action provided thereby, and permitting the arm to swing outwardly until the face 14$^a$ contacts with the lug or projection 12$^c$, this being the position shown in dotted lines at B in Fig. 1, in which position the seat portion is projected outwardly at a convenient point where the operator can readily pass to or out of seating position. After becoming seated, the arm is swung toward the table and the latch dropped, placing the parts in the proper position for use.

As shown in dotted lines in Fig. 1, the arm also forms a convenient support for a bracket 17 to which may be secured any suitable accessory container, thus placing the accessories at a position where they will not be disturbed accidentally, and convenient to the operator at all times.

The advantages of this particular construction will be readily understood, providing for maximum efficiency in use.

While the invention is capable of use with any preferred form of mounting for the seat indicated conventionally at 18, we prefer to employ a construction which will limit the pivotal movement of the seat itself, a bracket 18 for this purpose being shown in dotted lines in Fig. 1, this construction providing for a pivotal movement of the seat member 16 within restricted limits, thus tending to still further steady the seat without, however, entirely eliminating the pivotal movements, it being understood that the opposing walls of the open sided bearing, are adapted to abut against opposite side faces of the arm when the seat is moved pivotally. The specific structure of this particular part of the invention is not claimed herein, as the same forms the subject matter of a companion application filed by us February 3, 1913, Serial No. 745,942.

By this arrangement, it will be understood that there is provided not only a limited swinging movement of the arm itself, but also a limited pivotal movement of the seat on the arm, the result being that the position of the user of the seat is fixed within reasonable limits and acts to restrict unnecessary movements of the user. This particular feature is not only of advantage in connection with machine supports, but in other respects as well, for instance, as a mount for the seats of school children, especially those of earlier age, wherein the positioning of the seat as shown in full lines in Fig. 1 practically places the child in proper position with respect to the desk while the limiting of the pivotal movement of the seat prevents the child from moving the seat pivotally on its support in such manner as to materially change its position, although there is a freedom in such movement sufficient for the needs of the child.

While we have herein shown and described several ways in which our invention may be carried out, it will be readily understood that changes and modifications therein may be required or desired to meet the exigencies of use, and we therefore desire to be understood as reserving the right to make any and all such changes and modifications as may be found necessary to meet these conditions in so far as the same may fall within the spirit and scope of the invention as expressed in the accompanying claims.

Having thus described our invention, what we claim as new is:—

1. The combination with a stationary support, of a bracket secured thereto, an arm pivotally-secured to said bracket and having a lateral projection, a latch pivotally secured to said arm adapted to engage said bracket in closed position of the latch, and a laterally-extending lug on said latch engaging with the projection on the arm to limit the movement of the latch in both directions.

2. The combination with a stationary support, of a bracket secured thereto, an arm pivotally secured to said bracket, a seat having a pivotal support on said arm, and a pivoted device carried by said arm for limiting the pivotal movement of the arm in one direction, said pivoted device having a projection to limit its pivotal movement.

3. The combination with a stationary support, of a bracket secured thereto and provided with a projecting lug, an arm pivotally secured to said bracket and provided with a seat-bearing at its outer end, and a latch pivoted to said arm and having a laterally-extending lug for limiting the movement of the latch in both directions, the free end of said latch engaging the bracket-lug in closed position of the latch.

4. The combination with a stationary support, of a bracket secured thereto, an arm pivotally-secured to said bracket, a latch pivotally secured to the arm, the free end of the latch in closed position of the latter engaging the bracket to limit the swinging movement of the arm in one direction when the latch is closed, and means for limiting the swinging movement of the latch to open and closed positions.

5. The combination with an arm-supporting bracket having a projecting lug, of an arm pivotally-secured to the bracket and provided with a seat-bearing at its outer end, and a latch pivotally-secured to said arm adapted to have its free end engage with said bracket lug in closed position of the latch to limit the outward swinging movement of the arm, the arm being free to swing inwardly without releasing the latch, and means for limiting the swinging movement of the latch.

In testimony whereof we affix our signatures in presence of two witnesses.

EMANUEL KAUFMANN.
ROBERT J. HOLT.

Witnesses:
 HUGH A. MOSES,
 D. H. DOUGHERTY, Jr.

Copies of this patent may be obtained for five cents each, by addressing the "Commissioner of Patents, Washington, D. C."